United States Patent [19]
Brunton et al.

[11] 3,790,796
[45] Feb. 5, 1974

[54] METHOD AND APPARATUS FOR MEASUREMENT OF SHEET OPACITY

[75] Inventors: Donald C. Brunton; Carl R. Soltesz, both of Columbus, Ohio

[73] Assignee: Infra Systems, Inc.

[22] Filed: June 5, 1972

[21] Appl. No.: 260,017

Related U.S. Application Data
[62] Division of Ser. No. 114,520, Feb. 11, 1971, abandoned.

[52] U.S. Cl. .................................. 250/339, 250/349
[51] Int. Cl. .............................................. G01j 3/00
[58] Field of Search .. 250/83.3 D, 83.3 H, 339, 349

[56] References Cited
UNITED STATES PATENTS

| | | | |
|---|---|---|---|
| 3,551,678 | 12/1970 | Mitchell | 250/83.3 H |
| 3,017,512 | 1/1962 | Wolbert | 250/83.3 H |
| 3,614,450 | 10/1971 | Hill et al. | 250/83.3 H |
| 3,205,355 | 9/1965 | Ehlert | 250/83.3 H X |
| 3,228,282 | 1/1966 | Barker, Jr. | 250/83.3 D X |

*Primary Examiner*—Archie R. Borchelt
*Attorney, Agent, or Firm*—William T. Fryer, III

[57] ABSTRACT

An embodiment of the invention includes a method and apparatus for measurement of sheet opacity in combination with any optical ratio measurement of the same sheet such as weight wherein a reference band of infrared radiations which lies outside of any absorption band of the sheet material is utilized.

9 Claims, 4 Drawing Figures

INVENTORS
DONALD C. BRUNTON &
CARL R. SOLTESZ

BY Munson H. Lane

ATTORNEY

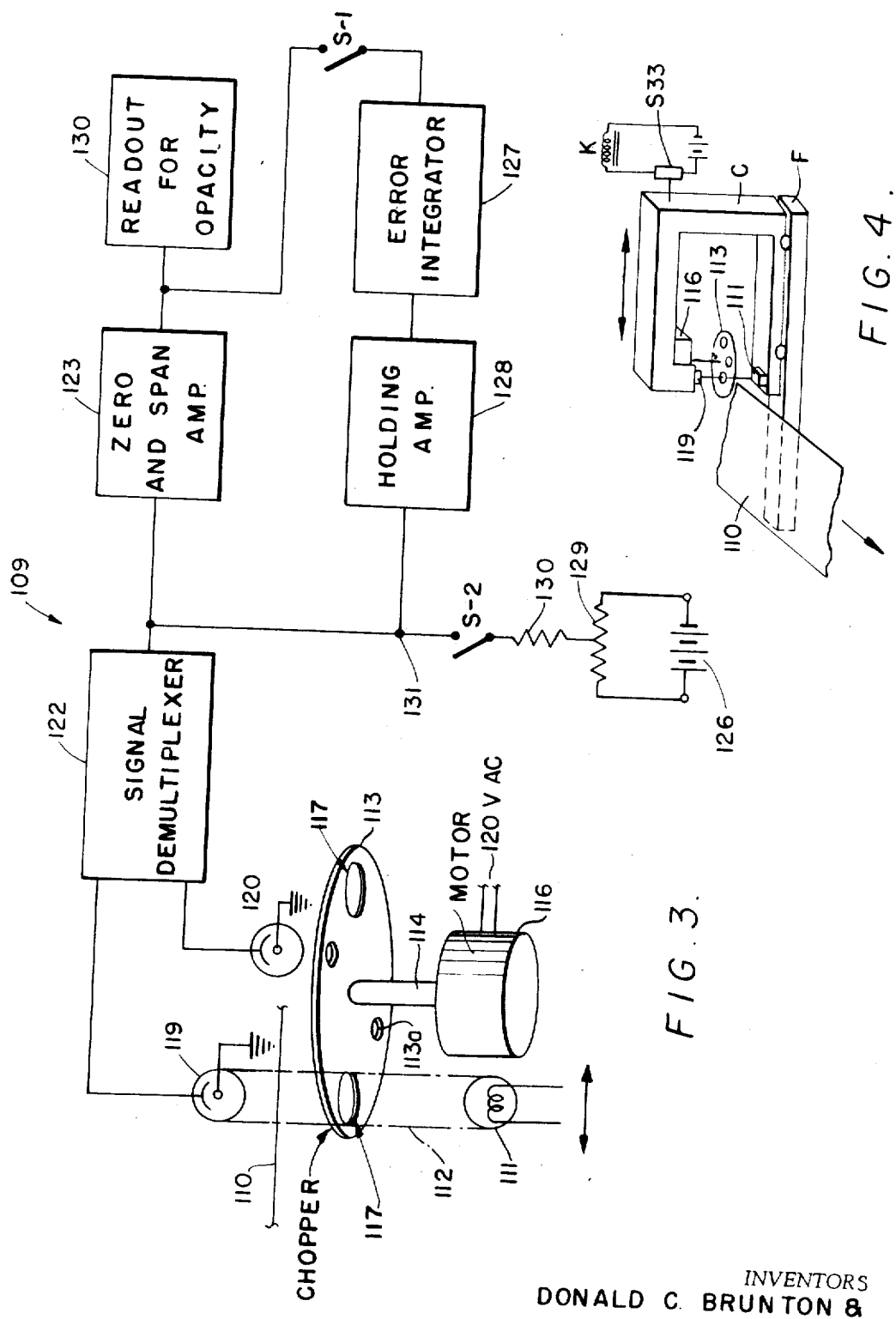

METHOD AND APPARATUS FOR MEASUREMENT OF SHEET OPACITY

This is a division of application Ser. No. 114,520, filed Feb. 11, 1971 for Method and Apparatus for Measurement of Sheet Opacity by Donald C. Brunton and Carl R. Soltesz, and now abandoned.

This invention relates to a method and apparatus for the measurement of the opacity of a sheet alone or in combination with any other optical ratio measurement of the same sheet.

THe use of ratio measurement of infrared radiation for moisture and fiber weight determinations on paper sheets has been well established as evidenced for example by U.S. Pat. No. 3,405,268, issued Oct. 8, 1968 to Donald C. Brunton and assigned to Brun Sensor Systems, Inc., the assignee of the present application; and by U.S. Pat. No. 3,510,264, issued Sept. 24, 1964 to Ralph C. Ehlert and assigned to General Electric Company.

One form of the present invention makes use of the fact that in such ratio measurements as described in the aforesaid patents, one of the wavelengths selected for such measurement is generally such that the radiation is for the most part not absorbed by the material of the sheet. This radiation is, however, severely attenuated by the scattering properties of the sheet. The attenuation resulting from scattering is generally wavelength independent (or nearly so) and is approximately the same in the infrared as in the visible region of the spectrum.

The ability of a sheet to block the transmission of visible light is normally described as the sheet's opacity. Hence a measurement of the light transmitted through a sheet is used as a measurement of opacity. Since a non-absorbing infrared wavelength is generally attenuated in the same manner as visible light, a measurement of the transmitted intensity of radiation of the non-absorbing wavelength is a measurement of opacity. Conversely, a wavelength in the visible region of the spectrum may be used as one reference wavelength for the infrared ratio measurement.

It is therefore an object in one form of this invention to take the reference wavelength of an infrared ratio measuring gauge and measure the transmitted intensity of the reference wavelength to determine the opacity of the sheet. In usual practice the reference wavelength which is the non-absorbing infrared wavelength (or in some cases a wavelength in the visible region of the spectrum) will be used in order to conform most closely to visible light condition but in some cases the absorption wavelength might be used. This measurement applies to transmission type gauges but in some cases it may be applied to reflection type gauges.

The term sheet as used in the specification and claims shall include any thin normally translucent or partially opaque material, such as paper, cloth, plastics, etc. which may be of a predetermined length or of an indeinite length. The method and apparatus may be used for measurement of opacity of a stationary sheet of definite length or for measurement of opacity of a continuously moving sheet of indefinite length by scanning the moving sheet.

It is another object of this invention to provide a sheet opacity gauge having automatic standardizing means.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described hPrein, the method and apparatus of this invention for measuring sheet opacity in combination with another optical measurement of the same sheet comprises impinging upon said sheet infrared radiations of one spectral band which lies outside any absorption band of the sheet material being measured or radiations in the visible band, impinging upon said sheet infrared radiations of a second spectral band which lies within a resonant absorption band of the sheet material being measured, photoelectrically sensing the intensities of the radiations in said first and second spectral bands after the infrared radiations have impinged upon said sheet and producing a first electric signal which varies with the intensity of the first spectral band emerging from said sheet, and producing a second electric signal which varies with the intensity of said second spectral band emerging from said sheet, taking the ratio of said first and second electric signals and producing a resultant electric signal that depends on the amount of the material in said sheet, and applying said first electric signal to an opacity indicator which is responsive to said first electric signal for indicating the opacity of said sheet.

THe invention consists in the novel circuits, parts, constructions, arrangements, combinations and improvements shown and described. The accompanying drawings, which are incorporated in and constitute a part of this specification, illustrate embodiments of the invention and, together with the description, serve to explain the principles of the invention.

Reference will now be made in detail to the present preferred embodiment of the invention, an example of which is illustrated in the accompanying drawings.

FIG. 3 is a schematic and block diagram showing another form of the invention; and FIG. 4 is a diagrammtic view showing the gauge of this invention mounted to scan a moving web of material.

Figure 1:
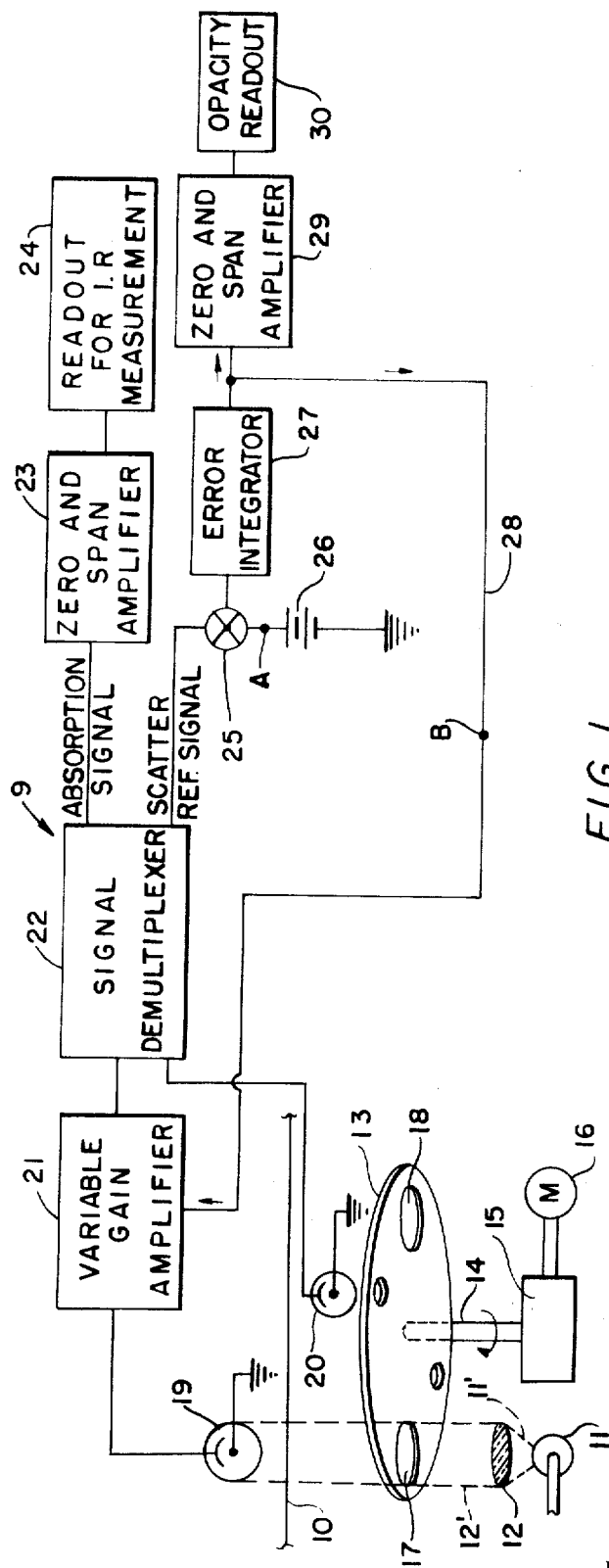
FIG. 1 is a schematic and block diagram of the invention.

Reference will now be made particularly to FIG. 1 wherein the reference numeral 9 is used to designate one form of the invention and the reference numeral 10 designates the sheet of material whose opacity is being measured. The sheet 10 may be of definite or indefinite length and may be fixed, or moving. A source of radiation 11 illustrated as an incandescent lamp having a continuous spectral output that includes the infrared band projects a beam of radiation 11' through a collimating lens 12, which in turn directs the collimated beam 12' through a selective filter disc 13 onto the sheet 10. The filter disc 13 mounted on a rotary shaft 14 is driven by a motor 16 through a suitable transmission 15. As the disc 13 rotates, the filters 17 and 18 mounted therein diametrically opposite each other move in quick succession through the collimated beam for developing individual pulses of radiation which are transmitted by the sheet 10 at a frequency corresponding to the speed of rotation of the filter disc 13.

A photodetector 19 is provided on the opposite side of the sheet 10 in the path of the infrared beam 12' for producing an electric signal which varies with the intensity of the infrared radiation impinging upon it.

One of the filters 17 and 18 is selected to transmit only infrared radiation of one spectral band which is characterized by it lying outside any absorption band of the sheet material being measured, while the other filter is selected to transmit only infrared radiation of a second spectral band which is characterized by it lying within a resonant absorption band of the sheet material being measured. The infrared radiations, reaching the detector 19 after passing through the rotating filters 17 and 18, alternate in time between the radiations which are within a spectral band lying outside of any absorption band of the sheet material, and the radiations which are of a spectral band lying within a resonant absorption band of the sheet material. The detector 19 in response to the radiations falling upon it will alternately produce a first electric signal which varies with the intensity of the radiations outside of any resonant absorption band of the sheet material and a second electric signal which varies with the intensity of the radiations within the resonant absorption band of the sheet material 10. The first and second electric signals alternating in time are fed through a variable gain amplifier 21 to a signal demultiplexer where the first signal, hereafter referred to as the scatter reference signal, is separated from the second signal, hereafter referred to as the absorption signal. The signal demultiplexer 22 is fed synchronizing signals from an auxiliary photodetector 20 which senses the angular position of the filters 17 and 18 in the rotating filter disc 13. The signal demultiplexer 22 is a synchronous demodulator or a sample and hold circuit receiving timing pulses from the auxiliary detector 20 such that the individual absorption signal pulses and the individual reference signal pulses are collected separately into average absorption voltages and average reference voltages.

The scatter reference signal is compared with a fixed reference voltage 26 in a differential amplifier 25 from which the difference voltage is fed into an error integrator 27. The error integrator 27 is an integrating amplifier which is charged up to a voltage whose magnitude is that voltage necessary to maintain the scatter signal voltage equal to the fixed reference voltage 26.

The output voltage from the error integrator is fed back to the variable gain amplifier 21 through feed back conductor 28. The variable gain amplifier 21 is the mechanism for ratio measurement in the basic infrared gauge. The reference signal controls the gain, i.e. $g = k_1/S$ ref. in. The absorption signal is proportional to the gain hence the absorption signal amplitude is actually a ratio of the absorption signal to the reference signal, i.e.

$$S \text{ abs. out} = S \text{ abs. in} \times K_2 g$$
$$= (S \text{ abs. in}/S \text{ ref. in}) k_1 k_2$$

where:

$S$ abs. out = absorption signal out $S$ abs. in = absorption signal in $S$ ref. in = reference signal in $k_1$ and $k_2$ are constants Since the absorption signal output from the signal demultiplexer 22 is a ratio signal as indicated above it varies in accordance with the quantity being measured. The absorption signal is fed from the signal demultiplexer 22 to a zero and span amplifier 23 from which it is fed to a readout device 24 for the quantity being measured. The zero and span amplifier 23 is provided for the purpose of zeroing the readout device when no signal is being fed to it and for adjusting the span of the readout device. The readout device may take various well known forms, one form being a simple voltage meter.

The apparatus described thus far is an infrared ratio measurement gauge for measuring different quantities relates to a sample sheet. The sample sheet for example may be a sheet of paper and the quantity being measured by the infrared gauge may be the moisture content of the sheet of paper. The sample sheet may be of other materials which are capable of infrared gauging and the quantity being measured by the infrared ratio gauge may be any quantity capable of such measurement. While one form of infrared ratio measurement gauge has been shown herein there are other forms which are adaptable for use with this invention, some of which are suggested in U.S. Pat. Nos. 3,150,264 and 3,405,268 referred to earlier in this description.

It is a purpose of this invention to take a signal which is present in an infrared ratio measurement gauge such as the one which has been described above and use it to obtain a measurement of sheet opacity. The scatter reference signal is particularly adapted for use in obtaining a measurement of opacity since it is derived from the spectral band of infrared radiation lying outside of any absorption band of the sheet material (or may be derived from the visible band of radiation). While the intensity of this spectral band of non-absorbed radiations is not attenuated by absorption the intensity of the radiations is attenuated by the scattering properties of the sheet. The attenuation of the intensity of the non-absorbed spectral band of radiation by scattering is proportional to the opacity of the sheet 10. Thus in accordance with this invention the scatter reference signal is processed in the error integrator as previously described, from whence it is fed through a zero and span amplifier 29 (similar to the zero and span amplifier 23 also previously described) to an opacity readout device 30 which may be a voltage meter.

Figure 2:
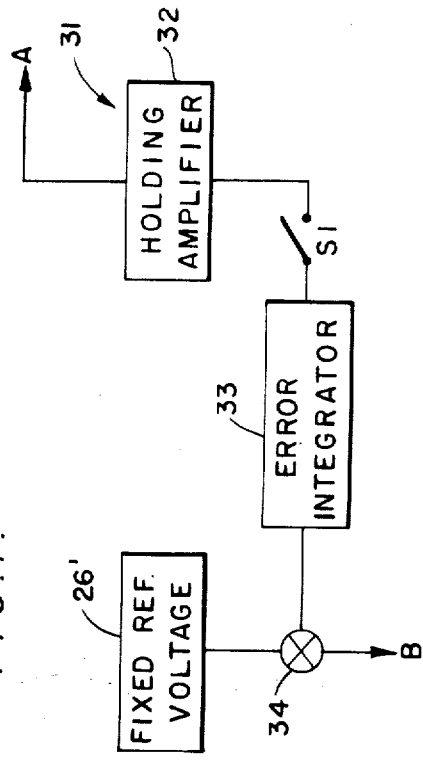
FIG. 2 is a schematic and block diagram of a circuit for insertion in the circuit disclosed in FIG. 1 in substitution for voltage source 26 at points A and B for automatic off sheet standardization to stabilize the measurement of a scanning type gauge.

When the infrared ratio measurement gauge is a scanning type gauge it is desirable to use an automatic off sheet standardization procedure to stabilize the measurement. A circuit 31 for this purpose is shown in FIG. 2. The automatic standardizing circuit shown in FIG. 2 is adapted to be inserted in the circuit shown in FIG. 1 at the points A and B in substitution for the voltage source 26 since the circuit shown in FIG. 2 includes its own fixed reference voltage source 26'. The auto-standardizing circuit includes a differential amplifier 34 which compares the output signal from the error integrator 27 with the fixed reference voltage 26', an error integrator 33 (similar to the error integrator 27), a reset action switch S1, and a holding amplifier 32, all connected in series with a feed back circuit between the output of error integrator 27 and the reference voltage input to the differential amplifier 25. The reset action switch will close during the standardization period to standardize the opacity output. This occurs only when the gauge head is in a standard position such as the edge of the sheet with a standard sample (e.g., nothing at all) between source and detector. Then the switch S1 closes and the voltage at B is driven by the error integrator 33 to be equal to the fixed voltage 26' and hence the opacity output is caused to read a fixed value. When the gauge head is returned to the sheet (by a timed program) S1 opens and the correction voltage is stored on the holding amplifier 31 and continues to correct the opacity output for any change which may have occurred in the scatter reference signal as it appears during standardization.

A gauge 109 for measuring opacity alone is shown in FIG. 3. The gauge includes a source of infrared radiations 111 positioned on one side of a moving web 110 so as to direct the radiations in a narrow beam 112 through the web 110 and onto a photodetector means 119 such as a photocell, which senses the infrared radiations transmitted through the moving web. A rotating chopper disc 113 carried on a shaft 114 and driven by the electric motor 116 interrupts the beam of infrared radiations at a preselected frequency in order that the electric signal produced may have a desired alternating current frequency which may be demodulated in a manner well known in the art. The chopper 113 will preferably be provided with a pair of similar filters 117 which pass only a selected band of infrared radiations which lie outside of any absorption band of the material of web 110. The photodetector 119 produces an electric signal which varies with the intensity of the infrared radiations falling upon it and delivers said electric signal to the demultiplexer 122. The demultiplexer 122 (like the demultiplexer 22 of FIG. 1) also receives a synchronizing signal from an auxiliary photodetector 120 and demodulates the electric signal from the photodetector 119 to produce an average opacity voltage output.

The opacity signal from the signal demultiplexer 122 is fed to a zero and span amplifier 123 from which it is fed to an opacity readout device 124. The zero and span amplifier 123 is provided for the purpose of amplifying the opacity signal and for zeroing the readout device when no signal is being fed to it and for adjusting the span of the readout device. The readout device 130 may be a simple voltage meter, but various type meters, recorders and indicators can be provided.

The opacity gauge 109 thus far described can be used to measure the opacity of a stationary web or sheet, but the gauge is particularly adapted for measuring the opacity of a moving web or sheet in which case the gauge 109 will be mounted to scan the moving web 110 shown in FIG. 4. Any suitable scanner may be used but as illustrated in FIG. 4, the photodetector 119 and rotary chopper 113 are mounted beneath an overhead arm A of a carriage C which is reciprocably driven along the frame F, and the source of infrared radiations 111 is mounted on the lower arm of the C-shaped carriage C. As the carriage C is reciprocably driven back and forth by suitable motor means (not shown) radiations from the source 111 are radiated upwardly through the moving web and are detected by the detector 119. The carriage C is moved off the edge of the moving web 110 at the beginning of each scanning cycle to permit automatic standardizing of the opacity gauge 109 by an automatic standardization circuit now to be described.

For standardizing the gauge 109 a reference voltage source 126 is provided with a potentiometer connected in circuit therewith so that a portion of the reference voltage can be taken from the potentiometer and applied to the input side of the zero and span amplifier 123. A resistor 130 and a circuit interrupter S–2 are provided in circuit between the adjustable arm of the potentiometer 129 and the input terminal of the zero and span amplifier 123.

Serially connected in circuit between the output side of the zero and span amplifier 123 and a common junction 131 with the input terminal of the amplifier 123 and circuit interrupter S–2 is a circuit interrupter S–1, an error integrator 127 and a holding amplifier 128. When the gauge 109 is in standardize position with a standard measurement situation, (i.e. with the gauge positioned off the edge of the web 110 as shown in FIG. 4) the off sheet position is detected by off-sheet detecting switch S–33 which closes and energizes the relay K to close the circuit interrupters S–1 and S–2. With S–1 and S–2 closed the potentiometer 129 is adjusted by an operator so that the output of the zero and span amplifier is zero. When the gauge moves from off sheet position to scanning position the off-sheet detecting switch S–33 opens, the relay K is de-energized and the circuit interrupters S–1 and S–2 are opened.

Each subsequent time the gauge 109 moves off sheet if the standardizing signal from the demultiplexer 122 has changed and hence the output of the zero and span amplifier is not zero, the circuit interrupters S–1 and S–2 being closed in the manner previously described, the error integrator 127 builds up the required correction voltage so that the output of amplifier 123 is restored to zero. The correction voltage is retained by the holding amplifier when the gauge 109 returns to scanning the sheet 110 and circuit interrupters S–1 and S–2 are opened.

It is within the scope of this invention that various means for scanning the web 110 and for operating the circuit interrupters S–1 and S–2 can be used since various such devices are well known in the art. It should also be clear that the scanning apparatus of FIG. 4 can be used with the system of FIGS. 1 and 2 in which relay K opens and closes switch S1.

What is claimed is:

1. A method for measuring sheet opacity in combination with another optical measurement of the same sheet comprising the steps of impinging upon said sheet infrared radiations of one spectral band which lies outside any absorption band of the sheet material being measured or radiations in the visible band, impinging upon said sheet infrared radiations of a second spectral band which lies within a resonant absorption band of the sheet material being measured, photoelectrically sensing the intensities of the radiations in said first and second spectral bands after the infrared radiations have impinged upon said sheet and producing a first electric signal which varies with the intensity of the first spectral band emerging from said sheet, and producing a second electric signal which varies with the intensity of said second spectral band emerging from said sheet, taking the ratio of said first and second electric signals and producing a resultant electric signal that depends on the amount of the material in said sheet, and applying said first electric signal to an opacity indicator which is responsive to said first electric signal for indicating the opacity of said sheet.

2. Apparatus for measuring sheet opacity in combination with another optical measurement of the same sheet comprising an optical measurement gauge including means for impinging upon said sheet infrared radiations of one spectral band which is characterized by it lying outside any absorption band of the sheet material being measured or radiations in the visible band, means for impinging upon said sheet infrared radiations of a second spectral band which is characterized by it lying within a resonant absorption band of the sheet material being measured, detector means that are responsive to the intensities of the first and second spectral bands after they have impinged upon said sheet and producing a first electric signal which varies with the intensity of said first spectral band emerging from said sheet and a second electric signal which varies with the intensity of said second spectral band emerging from said sheet, means taking the ratio of said first and second electric signals and producing a resultant signal that depends on the amount of the material in said sheet which is being measured, and an opacity indicator means which is responsive to said first electric signal for indicating the opacity of said sheet.

3. The apparatus set forth in claim 2 wherein said first and second spectral bands are transmitted through said sheet and said detector means is responsive to the transmitted intensities of said spectral bands emerging from said sheet.

4. The apparatus set forth in claim 2 wherein said first and second spectral bands are reflected from said sheet and said detector means is responsive to the reflected intensities of said spectral bands emerging from said sheet.

5. The apparatus set forth in claim 2 wherein said sheet is a continuously moving web and said apparatus includes cyclically scanning means whereupon said gauge is mounted for transversely scanning said moving web and periodically moving to an off-web position, and automatic means for standardizing said gauge in said off-web position.

6. A gauge for measuring the opacity of a sheet of material in combination with another optical measurement of the same sheet comprising a source of infrared radiations including at least infrared radiations to a first spectral band which lies outside of any absorption band of the sheet material being measured or radiations in the visible band, and infrared radiations of a second spectral band which lies within a resonant absorption band of the sheet material being measured, means for collimating the radiations from said source into a collimated beam passing through said sheet, a first filter for transmitting only the radiations in said first spectral band, a second filter for transmitting only the radiations in said second spectral band, chopper means intersecting said beam in which said first and second filters are mounted, said chopper means cyclically passing at a preselected frequency said filters in alternate succession through said beam and at all other times blocking said beam, a photoelectric detector means for sensing the radiations of said first and second spectral bands after the radiations in said band have passed through said sheet and alternately producing a first electric pulse signal which varies with the intensity of the radiations in said first spectral band, and a second electric pulse signal which varies with the intensity of the radiations in said second spectral band, a variable gain amplifier connected to said detector means for amplifying said first and second electric pulse signals, signal demultiplexer means connected to said variable gain amplifier for separately collecting said first and second electric pulse signals and producing a scatter reference signal output which is an average voltage value of said first electric pulse signal, and producing an absorption signal output which is an average voltage value of said second electric pulse signal, timing means for sensing the frequency of said chopper means and sending timing pulses to said signal demultiplexer means, a reference voltage source, comparing means for comparing the voltage from said reference voltage source with said scatter reference signal and producing an error signal which is the difference between said first reference voltage and said scatter reference signal, an error integrator responsive to said error signal, said error integrator being an integrating amplifier for producing an integrated voltage output, means feeding said integrated voltage output back to said variable gain amplifier to vary the gain of said variable gain amplifier in a manner such that said absorption signal output is equal to the ratio of said second electric pulse signal to said first electric pulse signal, readout means for said absorption signal, a zero and span amplifier connected to said error amplifier for amplifying said integrated voltage output, and an opacity readout means responsive to the amplified voltage output from said zero and span amplifier means for reading out an indication of the opacity of said sheet.

7. The apparatus set forth in claim 6 together with means whereupon said gauge is mounted for cyclically scanning said sheet and moving to an off-sheet position at periodic intervals, and automatic means for standardizing said gauge in said off-sheet position.

8. The apparatus set forth in claim 6 wherein said automatic standardizing means includes circuit interrupting means for sensing said off-sheet position and an auto-standardizing circuit controlled by said circuit interrupting means, said standardizing circuit being connected from the output of said error integrator to said comparing means and providing said reference voltage for said comparing means, said standardizing circuit including a differential amplifier receiving said integrated output signal as one input, and a preset reference voltage applied on the second input to said differential amplifier, an error integrator for integrating the output of said differential amplifier, and a holding amplifier for holding the error output voltage from said error integrator and applying said error voltage to said comparing means, said circuit interrupting means being connected in said standardizing circuit between said error integrator and said holding amplifier to close said standardizing circuit when the gauge is in the off-sheet position and to open said standardizing circuit when the gauge is moved away from said off-sheet position.

9. The apparatus set forth in claim 2 further comprising a reference voltage source, means for comparing the voltage from said reference voltage source with said first electric signal and producing an error signal which is the difference between said reference voltage and said first electric signal, means for integrating said error signal to provide an integrated voltage output, and means responsive to the output of said integrating means for controlling the level of said first and second electric signals, said opacity indicator means connected to be responsive to the output of said integrating means.

* * * * *